United States Patent [19]
Ichiyama

[11] Patent Number: 5,707,154
[45] Date of Patent: Jan. 13, 1998

[54] HYDRODYNAMIC FLUID PRESSURE BEARINGS

[75] Inventor: Yoshikazu Ichiyama, Ukyo-ku, Japan

[73] Assignee: Nidec Corporation, Kyoto, Japan

[21] Appl. No.: 771,298

[22] Filed: Dec. 20, 1996

[30] Foreign Application Priority Data

Dec. 26, 1995 [JP] Japan .................. 7-352810

[51] Int. Cl.⁶ .................................... F16C 32/06
[52] U.S. Cl. ................ 384/107; 384/113; 384/120
[58] Field of Search ........................ 384/100, 107, 384/113, 114, 115, 120

[56] References Cited

U.S. PATENT DOCUMENTS

| | | | |
|---|---|---|---|
| 4,254,961 | 3/1981 | Fersht et al. | 384/100 X |
| 4,445,793 | 5/1984 | Shinohara | 384/130 |
| 4,798,480 | 1/1989 | Van Beek | 384/120 X |
| 4,892,418 | 1/1990 | Asada et al. | 384/124 |
| 5,112,142 | 5/1992 | Titcomb et al. | 384/107 |

FOREIGN PATENT DOCUMENTS

| | | | |
|---|---|---|---|
| 62-4565 | 6/1987 | Japan . | |
| 146310 | 6/1990 | Japan | 384/115 |
| 181012 | 6/1992 | Japan | 384/115 |
| 248014 | 9/1992 | Japan | 384/115 |

*Primary Examiner*—Thomas R. Hannon
*Attorney, Agent, or Firm*—McCormick, Paulding & Huber

[57] ABSTRACT

A hydrodynamic bearing device includes a gap between a shaft and shaft holder. One of the shaft and shaft holder has a recess for separating by capillary action lubricant at an upper portion of the gap above the recess from lubricant at a lower portion of the gap below the recess. The separated lubricant at the recess forms a gas interposition in order to reduce lubricant resistance. A hole formed in the shaft or shaft holder communicates the air interposition to the external atmosphere to prevent air expansion and the build-up of bubbles in the lubricant which could otherwise cause contamination and leakage. An axially extending storage groove supplies by capillary action lubricant from either the upper or lower portion to the other portion if lubricant in the other portion decreases due to vaporization or leakage, whereby the loss of lubricant is minimized and the operating life of the surrounding components are increased.

35 Claims, 3 Drawing Sheets

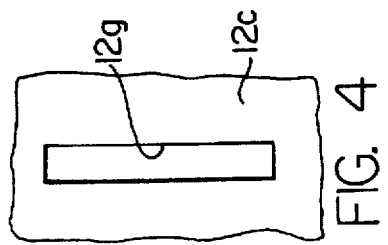
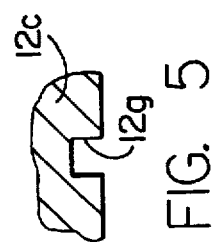
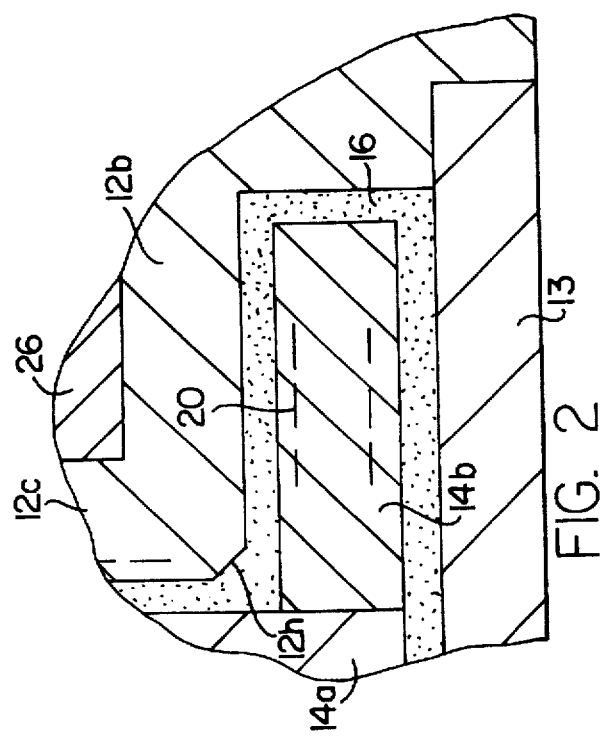
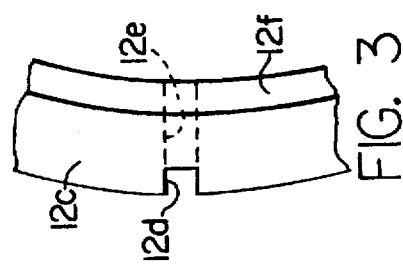

HYDRODYNAMIC FLUID PRESSURE BEARINGS

The present invention relates to motor bearings, and more particularly, to hydrodynamic fluid pressure bearings or liquid bearings for an electric motor.

BACKGROUND OF THE INVENTION

In an electric motor provided with a hydrodynamic bearing which makes use of the dynamic pressure of a lubricant or bearing liquid held in a gap or clearance between a shaft member such as a rotational shaft and a shaft holder such as a sleeve member, either of the shaft member and the shaft holder is rotatably coupled with a rotor of the motor and the other is coupled with a stator.

The gap between the shaft member and the shaft holder need not be completely filled with a lubricant, and therefore an air interposition extending circumferentially of the shaft member may be provided in a specific axial region of the gap between the shaft member and the shaft holder for reducing the frictional loss caused by viscosity resistance of the lubricant during the relative rotation of the shaft member and the shaft holder.

The air trapped in the air interposition is, however, likely to expand when the rotation of the motor raises the temperature. The expanded air exerts pressure on the lubricant causing it to escape from an outer end of the gap, thereby decreasing the operating life of a bearing means or contaminating the outside of the motor.

Japanese Patent Publication 62-4565 (1987), and U.S. Pat. Nos. 4,445,793; 4,892,418 and 5,112,142 provide an air interposition separating lubricants respectively held at upper and lower portions of the device. The air interposition communicates with the atmosphere externally of the motor via a communication hole such that any expanded air within the device is released to the atmosphere. However, in the prior art devices, if the amount of lubricant fluid at either the upper or lower portion is decreased because of vaporization and/or leakage between the outward end of the space and the air interposition, the operating life of the bearing means will still decrease unless the lubricant fluid is periodically supplemented.

SUMMARY OF THE INVENTION

It is an object of the present invention to provide a hydrodynamic bearing device having an air interposition communicating with the atmosphere and arranged to minimize the frictional loss of a lubricant or bearing liquid held in a gap between the shaft and an opposing surface, and to prevent escape of the lubricant caused by temperature increase as well as to supply additional lubricant without requiring maintenance service when the amount of lubricant held between the air interposition and an outer end of the gap is decreased, whereby such a decrease in the operating life will be minimized.

According to the present invention, the sleeve also has at least one storage groove for communicating the bearing liquid separated by capillary action at the air interposition. The bearing liquid is fed by the capillary action through the groove. When the bearing liquid which is filled in the upper side of the air interposition is decreased due to evaporation, an amount of the bearing liquid is supplemented from the lower side of the air interposition through the groove by the capillary action.

The foregoing and other objectives, features and advantages of the invention will be more readily understood upon consideration of the following detailed description of the invention taken in conjunction with the accompanying drawings.

BRIEF DESCRIPTION OF THE DRAWINGS

FIG. 2 is an enlarged partial view of the corner where the inner surface of the sleeve joins the annular shoulder of the motor of FIG. 1.

FIG. 3 is a top plan view showing an outer groove on a sleeve.

FIG. 4 illustrates an inner groove of the sleeve of FIG. 3.

FIG. 5 illustrates a cross section of the groove of FIG. 4.

DETAILED DESCRIPTION OF THE PREFERRED EMBODIMENTS

Figure 1:
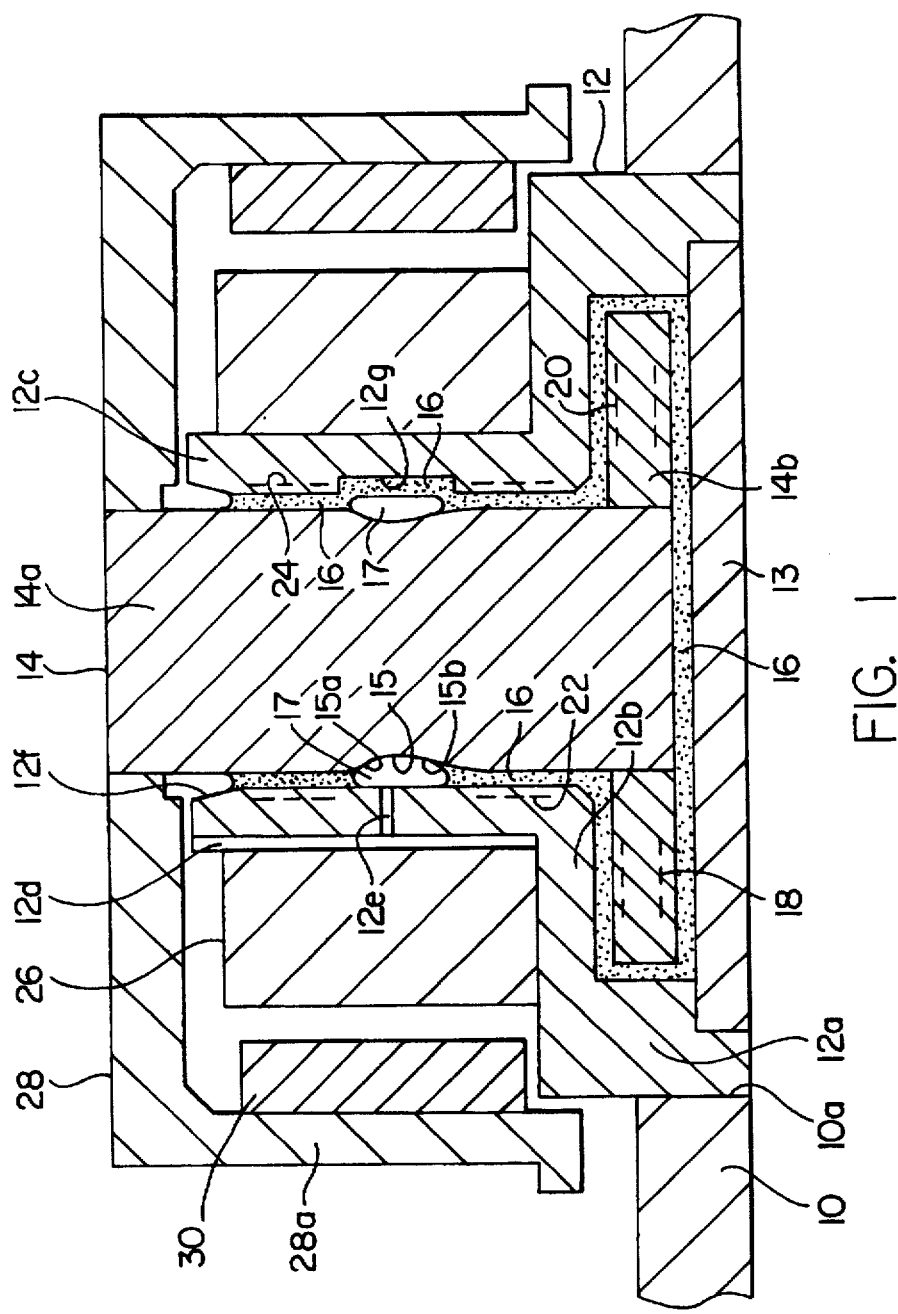
FIG. 1 is a schematic cross-sectional view of an electric motor employing the hydrodynamic bearing device according to a first embodiment of the present invention.

FIG. 1 is a schematic cross-sectional view of an electric motor for driving a data storage medium, such as a hard disk, which is assembled into a driving unit, in a first embodiment of the present invention. With reference to FIG. 1 showing an electric motor employing the hydrodynamic bearing device, a shaft holder 12 is fixedly fitted at the lowermost outer side of its mounting portion 12a into a circular fitting hole 10a provided in a base member 10.

The shaft holder 12 has a cylindrical sleeve portion 12c coaxially connected to a mounting portion 12a through an annular shoulder portion 12b. The mounting portion 12a has a diameter larger than the diameter of the sleeve portion 12c. A thrust cover plate 13 is fitted to the lowermost portion of the inner side of the mounting portion 12a for closing an opening defined by an inner surface of the mounting portion 12a so as to cooperate with the shaft holder 12 to form an internal dead end or closed bottom surface of the motor. In this embodiment, the shaft holder 12 and the thrust cover plate 13 constitute a shaft holding assembly.

At least one axially extending communicating groove 12d is formed on an outer side surface of the sleeve portion 12a. At least one air passageway 12e is provided at a substantially axially intermediate region of the communicating groove 12d for communicating between the groove 12d and the interior of the sleeve portion 12c in order to permit gas to escape to the external atmosphere. In this embodiment, the communicating groove 12d and the air passageway 12e constitute a communicating means. A tapered portion 12f is formed on the uppermost inner side of the sleeve portion 12c which thus increases the inner diameter of the sleeve portion 12c toward its upper end. FIG. 3 is a top plan view of a part of the sleeve portion 12c showing the cross-sectional shape of the groove 12d. The tapered portion 12f cooperates with the outer surface of the shaft 14 such that lubricant oil forms a capillary seal by surface tension.

Referring to FIG. 1, a shaft 14 has an annular thrust plate 14b fitted coaxially onto the lower end of a cylindrical shaft member 14a and is rotatably supported by the shaft holder 12 and the thrust cover plate 13. The shaft member 14a extends through the sleeve portion 12c. The thrust plate 14b is located in a circular space defined between the thrust cover plate 13 and the annular shoulder portion 12b.

An annular recess 15 is provided on the shaft member 14a at a substantially axially intermediate region of the shaft member 14a. The annular recess 15 is provided with an upper tapered surface 15a which is inwardly tapered toward the lower side of the shaft member in its axial direction and a lower tapered surface 15b which is inwardly tapered toward the upper side of the shaft member in its axial direction. The tapered surface 15b is rather moderately tapered relative to the upper tapered surface 15a. The inner end of the air passageway 12e opens at a portion of the inside of the sleeve portion 12c which is somewhat axially and upwardly displaced from the axial center portion of the recess and corresponds to the deepest portion of the annular recess 15.

The gap which is formed between the shaft 14, the shaft holder 12 and the thrust cover plate 13 is filled with a lubricant oil 16 as the bearing liquid. The lubricant 16 is held at a lower portion of the gap by capillary action at the lubricant's upper level adjacent to the lower end of the annular recess 15. Also, the gap which is formed between the shaft member 14a and the sleeve portion 12c is filled with the lubricant 16 which is held by capillary action at an upper portion of the gap at the lubricant's upper level adjacent to the lower end of the tapered portion 12f and at its lower level adjacent to the upper end of the annular recess 15. The tapered portion 12f prevents the lubricant from leaking out by surface tension. The gap confronting surfaces of the shaft member 14a and the sleeve portion 12c and the lubricant 16 filled therebetween constitute a radial hydrodynamic bearing. The confronting surface of the thrust plate 14b, the annular shoulder portion 12b, the thrust cover plate 13 and the lubricant 16 filled therebetween constitute a thrust hydrodynamic bearing.

The gap between the annular recess 15 and the inner side of the sleeve portion 12c contains an amount of gas (ordinarily air) thus forming an air or gas interposition 17 which separates by means of capillary action the lubricant at the upper portion of the gap from the lubricant at the lower portion of the gap, and which is communicated through the air passageway 12e and the communicating groove 12d to the outside atmosphere.

As best shown in FIG. 2, a corner 12h where the inner surface of the sleeve portion 12c joins the annular shoulder portion 12b is chamfered to facilitate the collection of bubbles which are generated in the lubricant 16 between the thrust plate 14b and the air interposition 17.

A plurality of herringbone shaped bearing grooves 18, 20, 22 and 24 (shown by broken lines) is provided on the upper and lower surface of the thrust plate 14b and the inner surface of the sleeve portion 12c for generating in the lubricant 16 a thrust load and a radial load during the rotation of the shaft 14 in a forward direction. The herringbone shaped grooves may be provided on the thrust cover plate 13, the annular shoulder portion 12b and the shaft member 14a. A groove pattern may be modified to a V-shape, X-shape or spiral shape or a combination thereof.

A storage groove 12g is formed on the inner surface of the sleeve portion 12c at a position opposing the annular recess 15 for storing an amount of the lubricant 16 by capillary action. For the storage groove 12g, consideration is made as to its cross-sectional configuration, material, surface roughness and characteristics of the lubricant 16 to enable proper holding of the lubricant 16 in the storage groove 12g by capillary action. The lubricant 16 is stored in the storage groove 12g for communicating the lubricant 16 by capillary action from one of the lower and upper portions of the gap to the other portion of the gap when the lubricant in the other portion of the gap is reduced due to vaporization or other means, whereby the reduced lubricant in one portion of the gap is supplemented by the lubricant in the other portion of the gap via the storage groove in order to minimize any reduction in operating life because of a loss of lubricant. In other words, the storage groove 12g communicates the lubricant 16 on both sides of the annular recess 15 to supplement reduced lubricant which would otherwise shorten the operating life of the surrounding components. The viscosity of the lubricant 16 is preferably 5 to 100 cp.

The width of the storage groove 12g may generally be less than 200 micrometers or preferably about 100 micrometers. The storage groove 12g preferably has a width greater than 5 to 10 micrometers such that the lubricant can be stored therein. The depth of the storage groove 12g is preferably as deep as possible so long as the physical strength of the sleeve portion 12c is not affected. Although the storage groove 12g of this embodiment is square in cross section and extends axially of the shaft 14 as shown in FIGS. 4 and 5, it is not limited to any particular shape. The storage groove 12g is circumferentially spaced on the shaft 14, one hundred eighty degrees (180) from the air aperture 12e, but may be located at any angular position on the shaft so long as the storage groove 12g is not directly opposing the air passageway 12e. Also, two or more grooves 12g may be provided and its cross-sectional shape may be modified to a triangular or semicircular shape. FIG. 4 illustrates a part of the inner side of the sleeve portion 12c where the storage groove 12g is formed, and FIG. 5 is a cross-sectional view of the storage groove 12g.

Although a stator 26 with stator coils wound on stator cores is mounted on the outside of the sleeve portion 12c, the air interposition 17 communicates to the outside atmosphere through the air passageway 12e and the communicating groove 12d. The communicating groove 12d need not extend from the uppermost portion to the lowermost portion of the sleeve portion 12c so long as a sufficient amount of air is permitted to move in.

A cup-like rotor 28 is mounted on the upper end of the shaft body 14a. A rotor magnet 30 is attached to the inner circumferential portion of the side wall portion 28a of the rotor hub 28 so as to radially oppose the stator 26, thereby constituting a rotary structure. If the rotor hub 28 is not made of a ferromagnetic material, it is desirable to install a ferromagnetic cylindrical yoke between the rotor magnet 30 and the outer wall portion 28a.

When the shaft 14 rotates relative to the shaft holder 12 and the thrust cover plate 13, the shaft member 14a and the sleeve portion 12c remain free from viscosity resistance of the lubricant 16 at the air interposition 17, thus the frictional loss caused by the lubricant 16 is reduced. As the air interposition 17 communicates through the air passageway 12e and the communicating groove 12d with the outside atmosphere, this structure vents gas to the external atmosphere in order to prevent the lubricant 16 from escaping from the upper end of the gap between the shaft member 14a and the sleeve portion 12c even if a temperature rise during the rotation causes expansion of the air in the air interposition 17 or the creation of bubbles in the lubricant 16.

The lubricant 16 is reserved or stored by capillary action in the storage groove 12g which communicates the lubricant 16 on both sides of the air interposition 17 (i.e. the upper and lower portions of the gap). If the portion of the lubricant 16 which is filled in the upper portion of the gap above the air interposition 17 is decreased due to evaporation, an amount of the lubricant 16 in the upper portion of the gap is supplemented through the supply groove 12g from the lubricant in the lower portion of the gap below the air interposition. Conversely, if the portion of the lubricant 16 which is filled in the lower portion of the gap below the air interposition 17 is decreased due to evaporation, an amount of the lubricant 16 in the lower portion of the gap is supplemented through the supply groove 12g from the lubricant in the upper portion of the gap above the air interposition. Hence, reduction in operating life caused by shortage of the lubricant 16 will be minimized.

The thrust hydrodynamic bearing portion generates a substantial number of bubbles in construction. Therefore, the tapered surface 15b of the annular recess 15 is milled to an elongated and moderate tapered form for compensating the upper level of the lubricant 16 in the thermal expansion of the bubbles.

Figure 6:
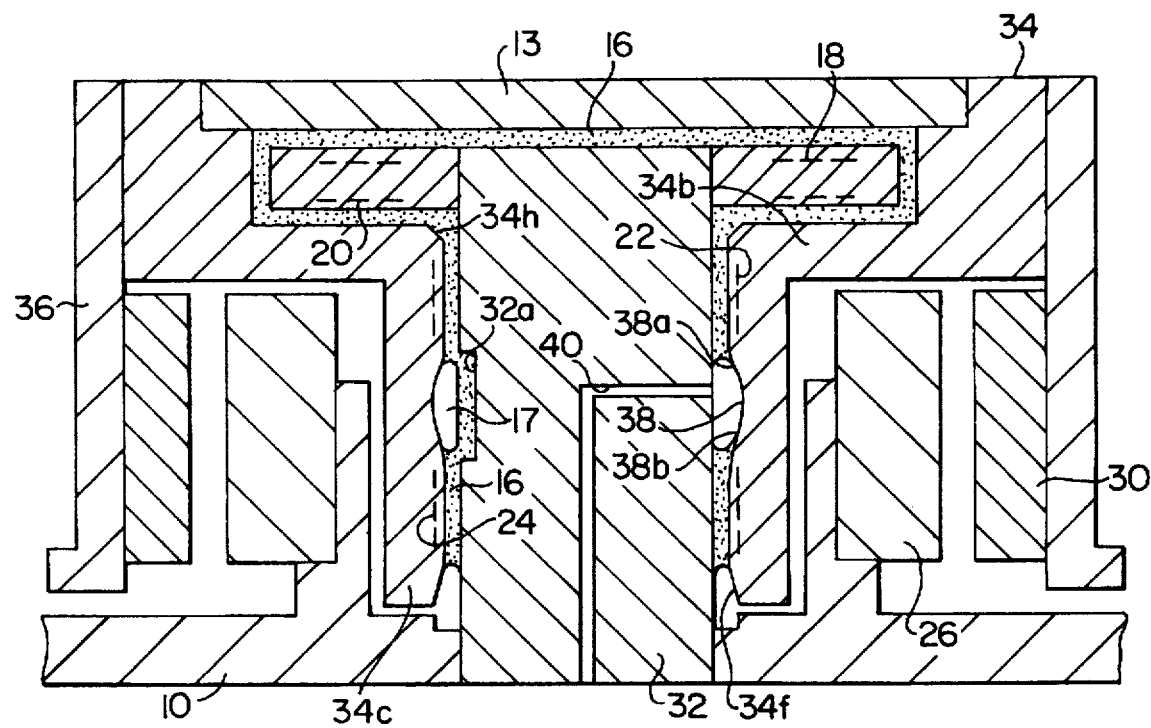
FIG. 6 is a schematic cross-sectional view of an electric motor employing the hydrodynamic bearing device according to a second embodiment of the present invention.

FIG. 6 shows an alternative embodiment of the present invention. In this embodiment, a stationary shaft 32 is fixed to a base member 10. A sleeve member 34 has a cylindrical sleeve portion 34c coaxially coupled to an annular shoulder portion 34b which has a diameter larger than that of the sleeve portion 34c. The sleeve member 34 also has a rotor hub 36 connected to the outer end portion of the annular shoulder portion 34b. A thrust cover plate 13 is fitted to the uppermost inner side of the annular shoulder portion 34b for closing its opening and forming an internal dead end of the sleeve member 34. A rotor magnet 30 is attached to an inner circumferential surface of the rotor hub 36. A stator 26 located to oppose the rotor magnet 30 constitutes a rotary structure. If the rotor hub 36 is not made of a ferromagnetic material, it is desirable to install a ferromagnetic cylindrical yoke between the rotor magnet 30 and the inner circumferential surface of the rotor hub 36. An air passageway 40 is formed through the shaft 32. In this embodiment, the hole serves as the air passageway instead of the air passageway 12e and the communicating groove 12d as employed in the first embodiment. An annular recess 38 is provided on the sleeve portion 32c at a substantially axially intermediate region of the sleeve portion 34c. The annular recess 38 is provided with an upper tapered surface 38a which is inwardly tapered toward the upper side of the shaft member in its axial direction and a lower tapered surface 38b which is inwardly tapered toward the lower side of the shaft member in its axial direction. The tapered surface 38b is rather moderately tapered relative to the upper tapered surface 38a. The inner end of the air passageway 40 opens at a portion of the inside of the shaft 32 which is somewhat axially and downwardly displaced from the axial center portion of the recess and corresponds to the deepest portion of the annular recess 38. A groove 32a is formed on the inner surface of the shaft 32 at a position opposing the annular recess 38 for storing an amount of the lubricant 16 by capillary action.

Figure 7:
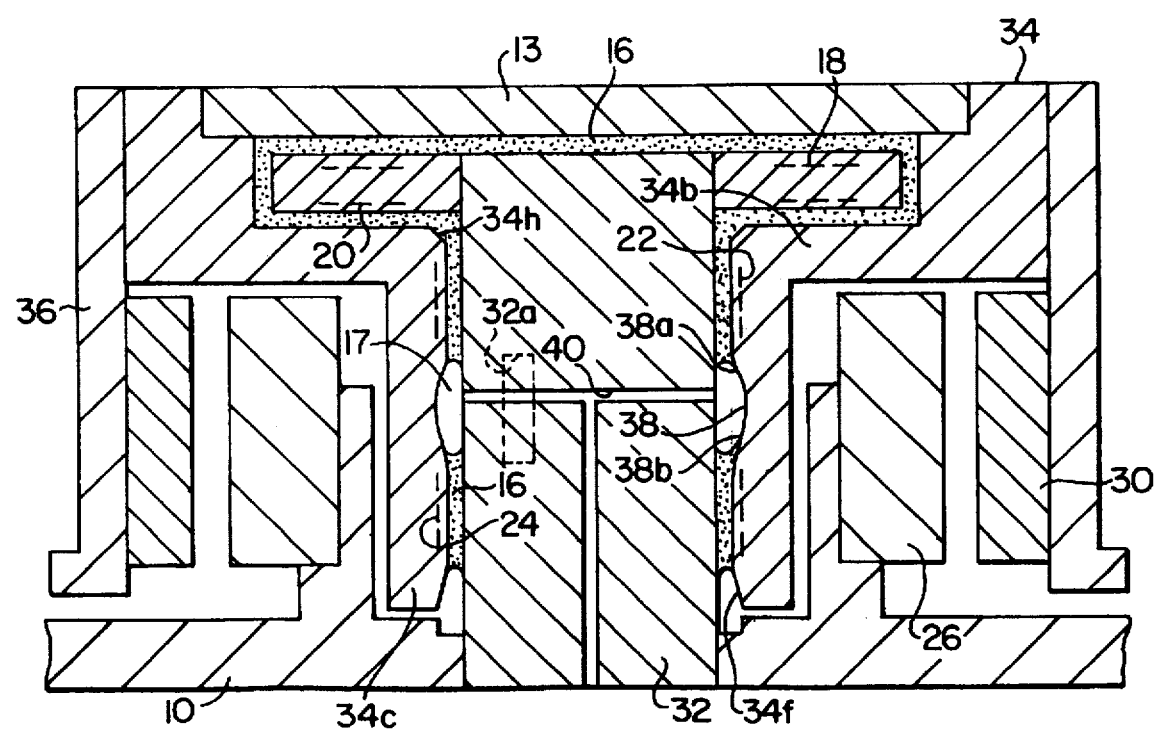
FIG. 7 shows an alternative air passageway for the shaft shown in FIG. 6.

An alternative embodiment of the air passageway 40 is shown in FIG. 7. The air passageway 40 diametrically passes through the stationary shaft between the air interposition, but does not open at the location of the groove 32a (as denoted by the phantom lines).

As has been described in the specification and shown in the drawings, the present invention employs an air interposition communicating through a communication means with the outside atmosphere in order to minimize the frictional loss of the lubricant and to prevent the lubricant from leaking out during a motor temperature increase. In case any of the two portions of the lubricant provided at opposite sides of the air interposition is decreased, the lubricant is supplemented by the other portion through a storage groove by capillary action. Accordingly, the lubricant requires no external replenishment and will stay for a relatively long period in the hydrodynamic bearing, thereby increasing the operating life of the motor.

The terms and expressions which have been employed in the foregoing specification are used therein as terms of description and not limitation, and there is no intention in the use of such terms and expressions of excluding equivalents of the features shown and described or portions thereof, it being recognized that the scope of the invention is defined and limited only by the claims which follow.

What is claimed is:

1. A hydrodynamic bearing device comprising:

a shaft member having an outer bearing surface defining at least one annular recess;

a sleeve member having an inner bearing surface for receiving and supporting said shaft member for relative rotation of the shaft member and the sleeve member, the inner bearing surface opposing the outer bearing surface leaving a bearing gap therebetween, the sleeve member being provided with a communicating hole to the external atmosphere, and the inner bearing surface of the sleeve member forming an axially extending storage groove thereon;

a bearing liquid filled in said bearing gap, at least one of the inner and outer bearing surfaces being provided with at least one bearing groove for generating a hydrodynamic pressure in said bearing fluid during the relative rotation of said shaft member and said sleeve member; and a supporting member for supporting the shaft member against a thrust load acting thereon, said bearing liquid being provided at an upper portion of the bearing gap above the recess and at a lower portion of the bearing gap below the recess, the bearing liquid at the upper and lower portions of the bearing gap being separated from one another at the recess to form a gas space for reducing viscosity resistance of the bearing liquid between the shaft member and the sleeve member, the storage groove communicating the bearing liquid by capillary action from one of the lower and upper portions of the bearing gap to the other portion of the bearing gap, and the communicating hole connecting the gas space to the outer atmosphere.

2. A hydrodynamic bearing device according to claim 1, wherein said annular recess of said shaft member is disposed at an axial center portion of said shaft member and the axial length of said annular recess is substantially equal to the axial length of said storage groove.

3. A hydrodynamic bearing device according to claim 1, wherein said supporting member includes a thrust plate fixed on the shaft member, said sleeve member surrounding the thrust plate to form a part of the gap which is continuous and filled with the bearing liquid.

4. A hydrodynamic bearing device according to claim 1, wherein the upper end portion of the inner bearing surface of said sleeve member is tapered to form a capillary or surface tension seal for preventing said bearing liquid from leaking to the outside of said bearing gap.

5. A hydrodynamic bearing device according to claim 1, wherein the shaft member is tapered at both ends of the annular recess to form a surface tension seal.

6. A hydrodynamic bearing device according to claim 5, wherein said shaft member is milled at one of the ends of the annular recess to an elongated and moderately tapered form.

7. A hydrodynamic bearing device according to claim 1, wherein the sleeve member has at least one axially extending communicating groove at the outer circumferential surface, the communicating groove being connected with the communicating hole for the communication of the gas space with the outer atmosphere.

8. A hydrodynamic bearing device according to claim 1, wherein the storage groove is located at a portion diametrically opposite from the annular recess.

9. A motor comprising:
a shaft;
a cylindrical sleeve for receiving and supporting said shaft for relative rotation of the shaft and the cylindrical sleeve, the shaft and sleeve respectively having an outer cylindrical surface having at least one annular recess and an inner cylindrical surface which oppose each other to form a clearance gap around said shaft, the sleeve member being provided with a communication hole to the external atmosphere, and the inner cylindrical surface of the sleeve forming an axially extending storage groove thereon;
a cup-shaped member having a cylindrical portion, said cup-shaped member being secured to an upper end portion of said shaft;
a magnet secured to an inner cylindrical surface of said cup-shaped member;
a stator core fixed to an outside of said sleeve;
at least one of inner and outer surfaces of respective said sleeve and said shaft having at least one pressure generating groove in said clearance gap;
an inner end portion of said shaft having a support member for supporting the shaft against a thrust load; and
a bearing liquid filling in said clearance gap, the bearing liquid being provided at an upper portion of the clearance gap above the recess and at a lower portion of the clearance gap below the recess, the bearing liquid at the upper and lower portions of the clearance gap being separated from one another at the recess to form a gas space for reducing viscosity of the bearing liquid between the shaft and the cylindrical sleeve, the storage groove communicating the bearing liquid by capillary action from one of the lower and upper portions of the clearance gap to the other portion of said gap, and the communication hole connecting the gas space to the outer atmosphere.

10. A motor according to claim 9, wherein said annular recess of said shaft is disposed at an axial center portion of said shaft and the axial length of said annular recess is substantially equal to the axial length of said storage groove.

11. A motor according to claim 9, wherein said support member includes a thrust plate fixed on the shaft, said sleeve surrounding the thrust plate to form a part of the clearance gap which is continuous and filled with the bearing liquid.

12. A motor according to claim 11, wherein the sleeve has at least one axially extending communication groove at the outer circumferential surface, the communication groove being connected with the communication hole for connecting the gas space with the outer atmosphere.

13. A motor according to claim 11, wherein the storage groove is located at a portion diametrically opposite from the annular recess.

14. A motor according to claim 9, wherein the upper end portion of the inner cylindrical surface of said sleeve is tapered to form a capillary or surface tension seal for preventing said bearing liquid from leaking out to the outside of said clearance gap.

15. A motor according to claim 9, wherein the shaft is tapered at both ends of the annular recess to form surface tension seals.

16. A motor according to claim 15, wherein said shaft is milled at one of the ends of the annular recess to an elongated and moderately tapered form.

17. A hydrodynamic bearing structure for supporting a rotator carrying a load for rotating, said hydrodynamic bearing structure comprising:
a shaft member having an outer bearing surface defining at least one annular recess;
a cylindrical sleeve member for receiving and supporting said shaft member for relative rotation of the shaft member and the cylindrical sleeve member, the sleeve member having an inner bearing surface provided with an axially extending storage groove thereon, and having a communication hole to the external atmosphere;
a bearing gap formed in a clearance between said inner bearing surface and said outer bearing surface and a bearing liquid in said bearing gap;
at least one bearing groove for generating a hydrodynamic pressure in said bearing liquid formed on at least one surface of said inner and outer bearing surfaces; and
a supporting member for supporting the shaft member against a thrust load, the bearing liquid being provided at an upper portion of the bearing gap above the recess and at a lower portion of the bearing gap below the recess, the bearing liquid at the upper and lower portions of the bearing gap being separated from one another at the recess to form a gas space for reducing viscosity resistance of the bearing liquid between the shaft member and the sleeve member, the storage groove communicating the bearing liquid by capillary action from one of the lower and upper portions of the bearing gap to the other portion of said gap, and the communication hole connecting the gas space to the outer atmosphere.

18. A hydrodynamic bearing structure according to claim 17, wherein said annular recess of said shaft member is disposed at an axial center portion of said shaft member and the axial length of said annular recess is substantially equal to the axial length of said storage groove.

19. A hydrodynamic bearing structure according to claim 17, wherein said supporting member includes a thrust plate fixed on the shaft member, said sleeve member surrounding the thrust plate to form a part of the bearing gap which is continuous and filled with the bearing liquid.

20. A hydrodynamic bearing structure according to claim 17, wherein the upper end portion of the inner bearing surface of said sleeve member is tapered to form a capillary or surface tension seal for preventing said bearing liquid from leaking out to the outside of said bearing gap.

21. A hydrodynamic bearing structure according to claim 17, wherein the shaft member is tapered at both ends of the annular recess to form surface tension seals.

22. A hydrodynamic bearing structure according to claim 21, wherein the shaft member is milled at one of the ends of the annular recess to an elongated and moderately tapered form.

23. A hydrodynamic bearing structure according to claim 17, wherein the sleeve member has at least one axially extending communication groove at the outer circumferential surface, the communication groove being connected with the communication hole for connecting the gas space with the outer atmosphere.

24. A hydrodynamic bearing structure according to claim 17, wherein the storage groove is located at a portion diametrically opposite from the annular recess.

25. A motor comprising:

a shaft;

a sleeve for receiving said shaft to allow relative rotation of the shaft and the sleeve, the shaft and the sleeve defining a gap therebetween, an axially extending storage groove formed on one of the shaft and the sleeve;

a hydrodynamic fluid filling the gap;

a hydrodynamic pressure groove and an atmosphere vent hole formed on one of the shaft and the sleeve for causing a hydrodynamic pressure in the fluid during relative rotation of the shaft and the sleeve; and a hydrodynamic bearing structure including an annular recess formed on at least one of the shaft and the sleeve on a surface that confronts the gap, the recess extending around the shaft to form an enlarged space in the gap to separate the hydrodynamic fluid, said hydrodynamic fluid being provided at an upper portion of the gap above the recess and at a lower portion of the gap below the recess, the hydrodynamic fluid at the upper and lower portions of the gap being separated from one another at the enlarged space for reducing viscosity of the hydrodynamic fluid between the shaft and the sleeve, the storage groove communicating the hydrodynamic fluid by capillary action from one of the lower and upper portions of the gap to other portion of the gap, and the vent-hole connecting the enlarged space to the outer atmosphere.

26. The motor according to claim 25, wherein the gap between said sleeve and said shaft is tapered at an end of the gap and at both ends of the enlarged space to form surface tension seals.

27. The motor according to claim 26, wherein said shaft is milled at one of the ends of the enlarged space to an elongated and moderately tapered form.

28. The motor according to claim 27, further including a thrust plate that is integral with the shaft, and wherein the sleeve has an enlarged diameter portion for surrounding the thrust plate leaving a gap therebetween, the gap around the thrust plate communicating with the gap between the sleeve and the shaft.

29. The motor according to claim 25, wherein the annular recess is formed on the shaft and the storage groove is formed on the sleeve.

30. The motor according to claim 29, wherein the annular recess and the storage groove is disposed to face each other.

31. A hydrodynamic bearing construction for an electric motor comprising:

a shaft;

a sleeve member for relatively rotatably receiving the shaft, the shaft and the sleeve member cooperating to form a clearance gap between the shaft and the sleeve member;

a bearing liquid filling the gap;

means for causing dynamic pressure in the liquid during the relative rotation of the shaft and the sleeve member in order to support the shaft and the sleeve member;

means for forming an annular space in the gap to separate the bearing liquid thereat; and means for partially communicating the separated liquid.

32. A hydrodynamic bearing construction according to claim 31, wherein the dynamic pressure causing means includes at least one bearing groove formed on one of the surfaces of the shaft and the sleeve that confront at the gap.

33. A hydrodynamic bearing construction according to claim 31, wherein the annular space forming means includes at least one annular recess formed at least on one of the shaft and the sleeve, the bearing liquid being provided at an upper portion of the gap above the recess and at a lower portion of the gap below the recess to form a gas space for reducing viscosity resistance of the bearing liquid between the shaft and the sleeve.

34. A hydrodynamic bearing construction according to claim 33, further comprising means for communicating the gas space with the outer atmosphere.

35. A hydrodynamic bearing construction according to claim 31, wherein the communicating means includes at least one axially extending storage groove for communicating the bearing liquid by capillary action from one of the lower and upper portion of the gap to the other portion of the gap.

* * * * *